H. G. PARROTT.
FAUCET.
APPLICATION FILED JULY 3, 1914.
1,183,488.
Patented May 16, 1916.
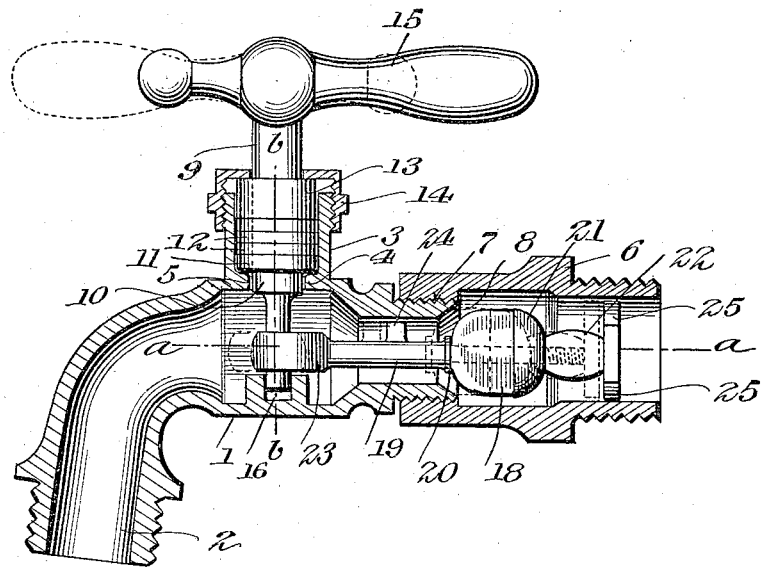
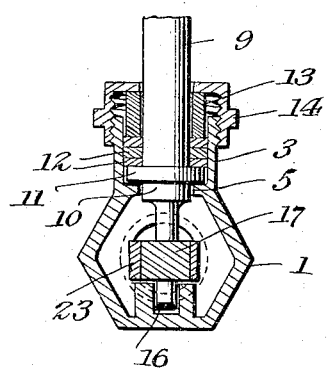
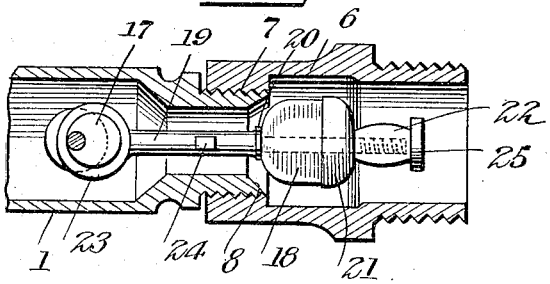
Witnesses
C. C. Faunce
J. W. Garner
Inventor
H. G. Parrott
By Victor J. Evans
Attorney

UNITED STATES PATENT OFFICE.

HERBERT G. PARROTT, OF CHICAGO, ILLINOIS.

FAUCET.

1,183,488. Specification of Letters Patent. Patented May 16, 1916.

Application filed July 3, 1914. Serial No. 848,923.

*To all whom it may concern:*

Be it known that I, HERBERT G. PARROTT, a citizen of the United States, residing at Chicago, in the county of Cook and State of Illinois, have invented new and useful Improvements in Faucets, of which the following is a specification.

This invention is an improved faucet of the Fuller bib type in which a ball valve is used, one object of the invention being to effect improvements in the construction of the operating stem and to provide a bearing for the lower end thereof, another object being to effect improvements in the construction of the nut for holding the ball valve on the valve stem and so as to cause the said nut to also operate as a guide for the ball valve and confine the movement thereof to a right line.

The invention consists in the construction, combination and arrangement of devices hereinafter described and claimed.

In the accompanying drawings: Figure 1 is a vertical longitudinal central sectional view of a faucet constructed in accordance with my invention with the ball valve in open position in full lines and in closed position in dotted lines. Fig. 2 is a detail sectional view of the same, on the plane indicated by the line *a—a* of Fig. 1 showing the construction of the eccentric for supporting the valve. Fig. 3 is a vertical sectional view of the same on the plane indicated by the line *b—b* of Fig 1.

The body 1 of the faucet is provided with the usual spout 2 and is provided on its upper side with a barrel 3 which is exteriorly threaded, is closed at its lower end as at 4 and the bottom of which is provided with a central opening 5. A nipple 6 is threaded to the body as at 7, the inner end of the body, where it is connected to the nipple being provided with a valve seat 8.

An operating stem 9 has a portion 10 which is mounted and has its bearing in the opening 5 and is provided, above the bearing portion, with an annulus 11 which is seated in the lower end of the barrel. Packing washers 12 are placed on the operating stem and in the barrel and are compressed therein by a collar 13 which is loose on the said stem 9 and a cap or box 14 which is screwed on the barrel. The usual handle 15 is attached to the upper end of the stem. The lower end of the stem is mounted in a bearing 16 in the lower side of the body 1 and is provided with an eccentric 17.

A ball valve 18, which is preferably made of rubber is fitted on a valve stem 19, bears against an annular flange 20 with which said stem is provided and is held in place by a cap 21 and also by a nut 22 which is screwed on the inner or rear end of said stem. The front end of the stem 19 is formed with a centrally arranged opening providing an eccentric strap 23 which engages the eccentric 17. Said stem also has a guide 24 on its upper side which engages the bore of the body and the nut 22 is formed with a slotted guide 25 which engages the wall of the bore of the nipple. The said guides coact with the bores of the body and nipple to keep the valve stem straight and exactly in the center of the valve seat 8 and confine the movement of the said stem with the valve thereon, to a right line, thus avoiding all side movements of the valve and hence causing it to close against the said seat when in closed position and to open therefrom when in open position. The bearing 16 bears against the lower side of the eccentric strap or head of the valve stem 19 and also serves as a guide for said stem and said valve.

Having thus described my invention, I claim:—

In a faucet, the combination of a body, a stem having an eccentric head or strap and formed with an annular flange, means coöperating with said eccentric head for giving a reciprocatory motion to said stem, a resilient valve slidably mounted on an end portion of said stem and formed with semi-spherical end portions, one of which abutting said flange, and a combined guide and nut member threaded on one end of said stem and abutting the central portion of the remaining end portion of said valve, the guide portion of said member being slotted to allow passing of water when said valve is in open position.

In testimony whereof I affix my signature in presence of two witnesses.

HERBERT G. PARROTT.

Witnesses:
CONSTANCE DEECKEN,
ANN PARROTT.

Copies of this patent may be obtained for five cents each, by addressing the "Commissioner of Patents, Washington, D. C."